United States Patent
Yamagishi et al.

(10) Patent No.: US 11,073,958 B2
(45) Date of Patent: Jul. 27, 2021

(54) ANTENNA DEVICE

(71) Applicants: SHARP KABUSHIKI KAISHA, Sakai (JP); TOPPAN FORMS CO., LTD., Tokyo (JP)

(72) Inventors: Shinji Yamagishi, Sakai (JP); Yasuhiro Sugita, Sakai (JP); Jean Mugiraneza, Sakai (JP); Yuki Owashi, Tokyo (JP); Yoshitaka Kawanabe, Tokyo (JP)

(73) Assignees: SHARP KABUSHIKI KAISHA, Sakai (JP); TOPPAN FORMS CO., LTD., Toyko (JP)

( * ) Notice: Subject to any disclaimer, the term of this patent is extended or adjusted under 35 U.S.C. 154(b) by 240 days.

(21) Appl. No.: 16/073,665

(22) PCT Filed: Jan. 27, 2017

(86) PCT No.: PCT/JP2017/002857
§ 371 (c)(1),
(2) Date: Jul. 27, 2018

(87) PCT Pub. No.: WO2017/131129
PCT Pub. Date: Aug. 3, 2017

(65) Prior Publication Data
US 2019/0042811 A1 Feb. 7, 2019

(30) Foreign Application Priority Data
Jan. 29, 2016 (JP) .............................. JP2016-015629

(51) Int. Cl.
*G06F 3/046* (2006.01)
*G06K 7/10* (2006.01)
(Continued)

(52) U.S. Cl.
CPC ......... *G06F 3/046* (2013.01); *G06K 7/10297* (2013.01); *H01Q 1/38* (2013.01);
(Continued)

(58) Field of Classification Search
CPC ...... G06F 3/046; G06K 7/10297; H01Q 7/00; H01Q 1/38; H01Q 1/2216
(Continued)

(56) References Cited

U.S. PATENT DOCUMENTS 5,869,790 A * 2/1999 Shigetaka ............. G06F 3/0414
178/18.01
5,896,127 A * 4/1999 Matsufusa ............ G06F 3/0414
345/173
(Continued)

FOREIGN PATENT DOCUMENTS

| JP | 2012-064123 A | 3/2012 |
|---|---|---|
| JP | 2015-097358 A | 5/2015 |
| WO | 2008/143212 A1 | 11/2008 |

*Primary Examiner* — Daniel I Walsh
(74) *Attorney, Agent, or Firm* — ScienBiziP, P.C.

(57) ABSTRACT

Provided is an antenna device that performs the reading of information via near field wireless communication by using a plurality of antenna patterns, and that has no insensitive area on the touch surface. An antenna device that reads information via near field wireless communication includes an antenna layer 20 that includes a plurality of antenna patterns 21a to 21l arrayed in parallel with one another, wherein at least a part of the antenna patterns 21a to 21l are arranged so as to overlap with one another when the antenna layer 20 is viewed in a plan view.

9 Claims, 11 Drawing Sheets

US 11,073,958 B2
Page 2

(51) Int. Cl.
    *H04B 5/00*  (2006.01)
    *H01Q 1/38*  (2006.01)
    *H01Q 7/00*  (2006.01)
    *H01Q 1/22*  (2006.01)
(52) U.S. Cl.
    CPC ............. *H01Q 7/00* (2013.01); *H04B 5/0025* (2013.01); *H01Q 1/2216* (2013.01)
(58) Field of Classification Search
    USPC .................................................. 343/174, 173
    See application file for complete search history.

(56) References Cited

U.S. PATENT DOCUMENTS

| | | | | |
|---|---|---|---|---|
| 6,535,203 | B2* | 3/2003 | Shigetaka | G06F 3/0445 345/173 |
| 6,744,426 | B1* | 6/2004 | Okamoto | G06F 3/03545 178/18.07 |
| 6,784,876 | B1* | 8/2004 | Nagai | G06F 3/046 178/18.01 |
| 8,264,624 | B2* | 9/2012 | Kaji | A63F 13/06 349/12 |
| 10,020,587 | B2* | 7/2018 | Henry | H01Q 13/02 |
| 10,528,176 | B2* | 1/2020 | Liu | G06F 3/0446 |
| 10,664,117 | B1* | 5/2020 | Pai | G06F 3/0445 |
| 10,732,764 | B1* | 8/2020 | Shanmugam | G06F 3/0446 |
| 2001/0043159 | A1* | 11/2001 | Masuda | H01Q 1/38 343/700 MS |
| 2002/0033773 | A1* | 3/2002 | Hirabayashi | G06F 1/1632 343/702 |
| 2002/0070652 | A1* | 6/2002 | Park | H01J 29/07 313/402 |
| 2002/0185981 | A1* | 12/2002 | Dietz | G06F 3/038 315/169.3 |
| 2003/0062889 | A1* | 4/2003 | Ely | G01D 5/2073 324/207.17 |
| 2003/0184483 | A1* | 10/2003 | Shibata | H01Q 1/362 343/702 |
| 2003/0206142 | A1* | 11/2003 | Yeh | G06F 3/046 343/867 |
| 2005/0030010 | A1* | 2/2005 | Jones | D06F 39/003 324/207.24 |
| 2006/0170597 | A1* | 8/2006 | Kurashima | H01Q 1/44 343/700 MS |
| 2007/0018969 | A1* | 1/2007 | Chen | G02F 1/13338 345/173 |
| 2007/0124515 | A1* | 5/2007 | Ishikawa | G06F 3/046 710/15 |
| 2007/0209920 | A1* | 9/2007 | Yanagi | H01Q 9/40 200/5 A |
| 2007/0262967 | A1* | 11/2007 | Rho | G02F 1/13338 345/173 |
| 2008/0231603 | A1* | 9/2008 | Parkinson | B60K 35/00 345/173 |
| 2009/0051620 | A1* | 2/2009 | Ishibashi | H01Q 1/243 343/897 |
| 2009/0073138 | A1* | 3/2009 | Lee | G06F 3/0412 345/173 |
| 2009/0096694 | A1* | 4/2009 | Ito | G06K 19/07749 343/788 |
| 2010/0001971 | A1* | 1/2010 | Jiang | B82Y 10/00 345/173 |
| 2010/0078787 | A1* | 4/2010 | Yakubo | G06K 19/07749 257/679 |
| 2010/0171891 | A1* | 7/2010 | Kaji | G02F 1/13338 349/12 |
| 2010/0207902 | A1* | 8/2010 | Juan | G06F 3/0412 345/173 |
| 2010/0302204 | A1* | 12/2010 | Miyayama | G06F 3/0418 345/174 |
| 2010/0317409 | A1* | 12/2010 | Jiang | G06F 1/1626 455/566 |
| 2011/0273382 | A1* | 11/2011 | Yoo | H01Q 9/42 345/173 |
| 2012/0133597 | A1* | 5/2012 | Chen | H01Q 1/2225 345/173 |
| 2012/0143655 | A1* | 6/2012 | Sunaoshi | G06Q 10/06395 705/7.41 |
| 2012/0162016 | A1* | 6/2012 | Lin | H01Q 1/2266 343/700 MS |
| 2012/0162032 | A1* | 6/2012 | Yang | H01Q 1/2266 343/720 |
| 2012/0162128 | A1* | 6/2012 | Hyoung | G06F 3/0446 345/174 |
| 2012/0299850 | A1* | 11/2012 | Lee | G06F 3/046 345/173 |
| 2013/0229362 | A1* | 9/2013 | Liu | G06F 1/1698 345/173 |
| 2014/0062916 | A1* | 3/2014 | Hong | G06F 3/041 345/173 |
| 2014/0104157 | A1* | 4/2014 | Burns | H01Q 1/44 345/156 |
| 2014/0132529 | A1* | 5/2014 | Jeong | G06F 3/03545 345/173 |
| 2015/0022081 | A1* | 1/2015 | Li | H01Q 1/2266 315/34 |
| 2015/0042604 | A1* | 2/2015 | Lu | G06F 3/044 345/174 |
| 2015/0199054 | A1* | 7/2015 | Kikuchi | G06F 3/045 345/174 |
| 2015/0214622 | A1* | 7/2015 | Tenno | H01Q 1/38 343/702 |
| 2015/0242027 | A1* | 8/2015 | Kida | G06F 3/0418 345/173 |
| 2015/0277633 | A1* | 10/2015 | Jiang | G06F 3/044 345/174 |
| 2015/0325927 | A1* | 11/2015 | Ito | H01Q 1/243 343/860 |
| 2016/0034081 | A1* | 2/2016 | Ichiki | G06F 3/044 345/173 |
| 2017/0177138 | A1* | 6/2017 | Orlovsky | G06F 3/0446 |
| 2017/0205919 | A1* | 7/2017 | Shibata | H01Q 1/243 |
| 2017/0237152 | A1* | 8/2017 | Lee | H01Q 5/371 343/702 |
| 2017/0351355 | A1* | 12/2017 | Hsieh | G06F 3/0412 |
| 2017/0371452 | A1* | 12/2017 | Endo | G06F 3/044 |
| 2017/0373397 | A1* | 12/2017 | Yashiro | H01Q 1/38 |
| 2018/0032166 | A1* | 2/2018 | Orihara | G06F 3/03547 |
| 2018/0046283 | A1* | 2/2018 | Yoshida | G06F 3/044 |
| 2018/0220540 | A1* | 8/2018 | Suzuki | H05K 5/0017 |
| 2019/0036208 | A1* | 1/2019 | Yamagishi | G06F 3/04162 |
| 2019/0042811 | A1* | 2/2019 | Yamagishi | G06F 3/046 |
| 2019/0237875 | A1* | 8/2019 | Yamagishi | G06K 19/07749 |
| 2020/0033968 | A1* | 1/2020 | Yamagishi | G06F 3/0445 |
| 2020/0201470 | A1* | 6/2020 | Oh | H01Q 9/0407 |
| 2020/0393932 | A1* | 12/2020 | Kida | G06F 3/04166 |

* cited by examiner

ANTENNA DEVICE

TECHNICAL FIELD

The present invention relates to an antenna device that includes antenna patterns for near field wireless communication and reads information via near field wireless communication.

BACKGROUND ART

In recent years, the following technique is often used: between an IC card (contactless IC card) that does not include a power source and incorporates an antenna element for wireless communication, and a communication device that includes a power source, near field communication is performed between the IC card and the communication device without the two being brought into contact with each other. For example, in a case where wireless communication (near field communication) is performed between a communication device and a contactless IC card, the contactless IC card is brought close to the communication device, to such an extent that the distance between the antenna element of the communication device and the contactless IC card is equal to or less than a predetermined distance. The communication device includes a power source, and power is supplied to the antenna element for near field wireless communication incorporated in the communication device, whereby a magnetic field is generated by the antenna element. Then, by the magnetic field generated by the communication device when the contactless IC card is brought close to the communication device, induced current is caused to flow through the antenna element of the contactless IC card. Thus, electric power can be supplied from the communication device to the contactless IC card. Then, the contactless IC card causes a circuit (for example, an IC chip) in the contactless IC card to operate, with use of the electromotive force generated by the induced current. In this way, by bringing a contactless IC card close to a communication device, wireless communication (near field communication) can be performed between the contactless IC card and the communication device.

Such an antenna device in which an antenna element is incorporated in a display terminal is disclosed in Patent Document 1. In the display terminal disclosed in Patent Document 1, when a touch operation is performed by an IC card with respect to the display area, data are transmitted/received between the display terminal and an IC card reader/writer via an antenna coil at the touch operation position, and at the same time, control corresponding to display contents displayed on the display terminal is performed in correspondence to the touch operation position.

PRIOR ART DOCUMENT

Patent Document

Patent Document 1: JP-A-2012-64123

SUMMARY OF THE INVENTION

Problem to be Solved by the Invention

In the case of the conventional antenna device as disclosed in Patent Document 1 and the like, a plurality of antennas each of which is in a rectangular coil form are arranged on a touch surface with respect to which a touch operation is performed by an IC card, so that a touch operation position is detected. As illustrated in (a) and (b) of FIG. 11, for example, when the middle point of the IC card 91 is positioned on an antenna line 92, however, signals of the IC card 91 are not read out in some cases. Since the magnetic field generated from the antenna line 92 is in a horizontally symmetric concentric circle form, in a case where the antenna line 92 passes through the midpoint of the IC card 92, magnetic fields generated on the left and right sides cancel each other, which causes no electromotive force to be generated on the IC card side, thereby causing the state to shift to an insensitive state. To make the explanation more understandable, (a) and (b) of FIG. 11 illustrate an exemplary case where one antenna line passes through the midpoint of the IC card, but in a case of a coil-form antenna, the identical phenomenon occurs when the midpoint of the IC card is positioned at the center of the bunch of a plurality of antenna lines that form the coil. This leads to the problem that there is unavoidably an insensitive area on the touch surface on which a touch operation by an IC card or the like is performed.

In light of the above-described problem, it is an object of the present invention to provide an antenna device that includes a plurality of antenna patterns and reads information via near field wireless communication, wherein a touch surface of the antenna device has no insensitive area.

Means to Solve the Problem

To solve the above-described problem, an antenna device according to one embodiment of the present invention is an antenna device that reads information via near field wireless communication, and the antenna device includes an antenna layer that includes a plurality of antenna patterns arrayed in parallel with one another, wherein at least a part of the antenna patterns are arranged so as to overlap with one another when the antenna layer is viewed in a plan view.

According to this configuration, at least a part of the antenna patterns are arranged so as to overlap with one another when the antenna layer is viewed in a plan view. Accordingly, even if an object to be read is located at such a position at which the reading of the object cannot be performed by one antenna pattern, the possibility that the reading of the object can be performed by an antenna pattern that is adjacent to and overlaps with the foregoing antenna pattern is increased.

Effect of the Invention

With the present invention, it is possible to provide an antenna device that includes a plurality of antenna patterns and reads information via near field wireless communication, wherein a touch surface of the antenna device has no insensitive area.

MODE FOR CARRYING OUT THE INVENTION

Figure 1:
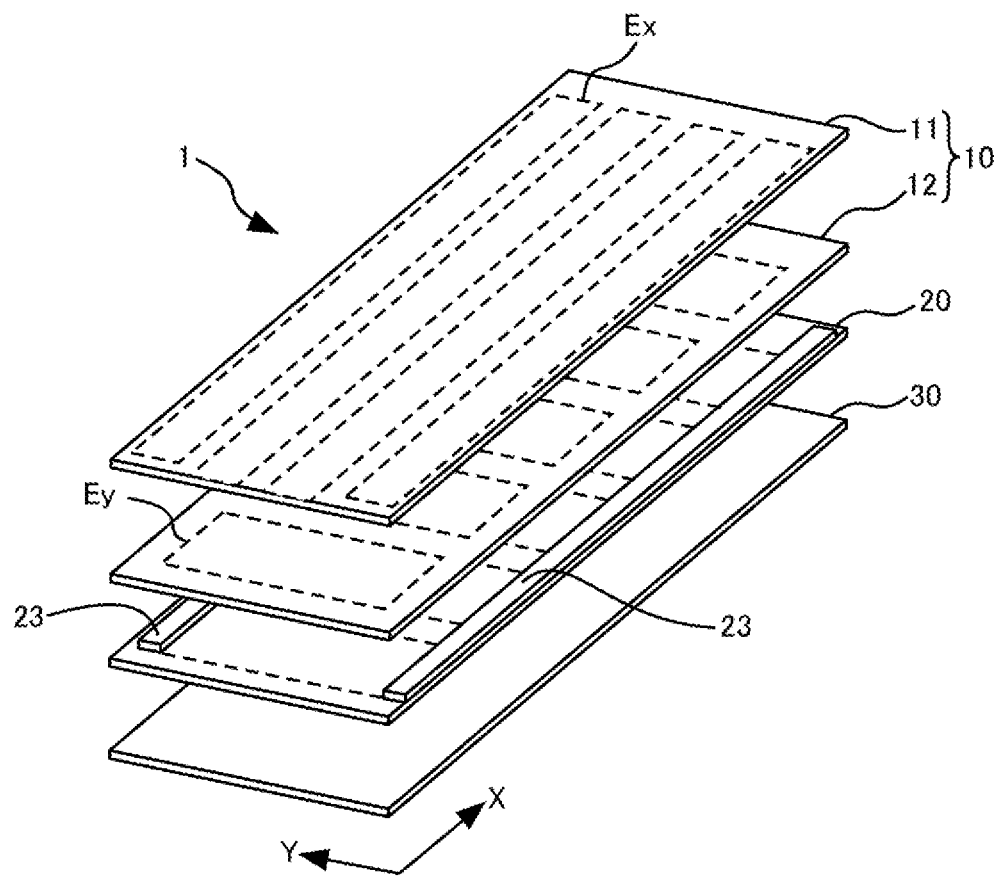
FIG. 1 is an exploded perspective view illustrating a schematic configuration of an antenna device in Embodiment 1.

An antenna device according to one embodiment of the present invention is an antenna device that reads information via near field wireless communication, and the antenna device includes an antenna layer that includes a plurality of antenna patterns arrayed in parallel with one another, wherein at least a part of the antenna patterns are arranged so as to overlap with one another when the antenna layer is viewed in a plan view (the first configuration).

According to this configuration, at least a part of the antenna patterns are arranged so as to overlap with one another when the antenna layer is viewed in a plan view. Thereby, even if an object to be read is located at such a position at which the reading of the object cannot be performed by one antenna pattern, the possibility that the reading of the object can be performed by an antenna pattern that is adjacent to and overlaps with the foregoing antenna pattern is increased. This makes it possible to provide an antenna device that has no insensitive area on the touch surface.

It is also preferable that the first configuration is further characterized in that at least a part of the antenna patterns are arranged so as to be shifted by half pitch (the second configuration).

With this configuration, the antenna patterns can be arranged regularly and efficiently.

It is also preferable that the first or second configuration is further characterized in further including FPC substrates that are connected with the antenna patterns at both ends in a second direction that intersects with the first direction, wherein, in a portion where antenna lines of adjacent ones of the antenna patterns intersect with each other when viewed in a plan view, either one of the antenna lines is arranged through a contact hole formed in the FPC substrate (the third configuration).

With this configuration, the antenna lines of adjacent ones of the antenna patterns can be arranged so as to intersect with each other in the FPC substrate area, without contact with each other.

It is also preferable that any one of the first to third configurations is further characterized in that the antenna pattern is formed in a loop form or in a spiral form wound twice or more (the fourth configuration).

It is also preferable that any one of the first to fourth configurations is further characterized in that two of the antenna layers are provided, wherein the two antenna layers are arranged in such a manner that a direction in which the antenna patterns included in one of the two antenna layers are arrayed, and a direction in which the antenna patterns included in the other antenna layer are arrayed, intersect at right angles (the fifth configuration).

With this configuration, it is possible to perform the reading in two directions that intersect at right angles, with the two antenna layers, whereby X, Y coordinates of the position of the object to be read can be detected.

Any one of the first to fifth configurations may further include a display panel (the sixth configuration). With this configuration, a display device having a near field wireless communication function can be provided.

The sixth configuration is preferably further characterized in further including a light diffusion film provided between the display panel and the antenna layer (the seventh configuration). With this configuration, moire occurring due to the interference between the pixel patterns on the display panel and the antenna patterns in the antenna layer, and the like, can be suppressed.

The sixth or seventh configuration may be characterized in further including a touch panel (the eighth configuration). With this configuration, a touch-panel-equipped display device having a near field wireless communication function can be provided.

Any one of the first to eighth configuration can be characterized in that the antenna layer is made of a transparent metal or a metal that is patterned in a mesh form (the ninth configuration). With the antenna device according to this ninth configuration, it is possible to prevent the antenna layer from blocking light, particularly in a case where the antenna layer is laminated with a display panel, a touch panel, or the like.

EMBODIMENT

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of a part of constituent members is omitted. Further, the dimension ratios of the constituent members illustrated in the drawings do not necessarily indicate the real dimension ratios.

Embodiment 1

Embodiment 1 is an antenna device that is configured as a display device including a touch panel and an antenna element.

FIG. 1 is an exploded perspective view illustrating a schematic configuration of an antenna device 1 in Embodiment 1. As illustrated in FIG. 1, the antenna device 1 includes a touch panel 10, an antenna layer 20 and a display panel 30.

When a user touches the screen with his/her finger, a pen, or the like, the antenna device 1 detects the touch position with the touch panel 10, and performs a processing operation corresponding to an object displayed at the touch position. When an IC card approaches the screen, the antenna layer 20 reads information of the IC card in a non-contact state, and performs a corresponding processing operation. In other words, the antenna device according to the present embodiment can be subjected to both types of input operations, i.e., input by a touch operation with a finger, a pen, or the like, and input by reading of an IC card.

The display panel 30 is, for example, a liquid crystal panel. An embodiment in which the display panel 30 is a liquid crystal panel is described as the present embodiment, but the display panel 30 is not limited to a liquid crystal panel. An arbitrary display panel can be used as the display panel 30 as long as it is a panel that has a function of displaying an image, such as an organic electroluminescence (EL) panel. In FIG. 1, the illustration of known members of the display panel 30 such as a backlight is omitted, and detailed descriptions of the same are omitted hereinafter as well.

The touch panel 10 includes a first electrode layer 11 and a second electrode layer 12. The first electrode layer 11 includes X-direction electrode patterns Ex formed on a substrate made of an insulative material (for example, polyethylene terephthalate (PET)). The number of X-direction electrode patterns Ex is arbitrary. The X-direction electrode patterns Ex are, for example, transparent conductive patterns (transparent electrodes) formed with ITO or the like. Further, the X-direction electrode patterns Ex may be formed with mesh patterns of thin metal wires (for example, copper). By forming the X-direction electrode patterns Ex in this way, it can be made sure to prevent the X-direction electrode patterns Ex from blocking light (to ensure a certain level of light permeability).

The second electrode layer 12 includes a plurality of Y-direction electrode patterns Ey extending along the Y direction, which intersect with the X-direction electrode patterns Ex at right angles. The Y-direction electrode patterns Ey are made of a material identical to that for the X-direction electrode patterns Ex. The number of the Y-direction electrode patterns Ey is also arbitrary.

Each X-direction electrode pattern Ex has a shape elongated in the X direction. Each Y-direction electrode pattern Ey has a shape elongated in the Y direction. Each of the X-direction electrode patterns Ex and the Y-direction electrode patterns Ey is connected to a touch panel controller (not illustrated) via a lead line. The touch panel controller outputs a driving signal for sequentially driving the X-direction electrode patterns Ex, thereby driving the X-direction electrode patterns Ex sequentially. This causes electric fields to be generated between the X-direction electrode patterns Ex and the Y-direction electrode patterns Ey. Then, the touch panel controller receives sense signals from the Y-direction electrode patterns Ey, and checks the signal values of the sense signals, thereby detecting a touch point (a portion where the electric field has changed) on the touch panel surface.

In the antenna layer 20, a plurality of antenna patterns are formed. The antenna patterns in the antenna layer 20 are described in details later.

Figure 2:
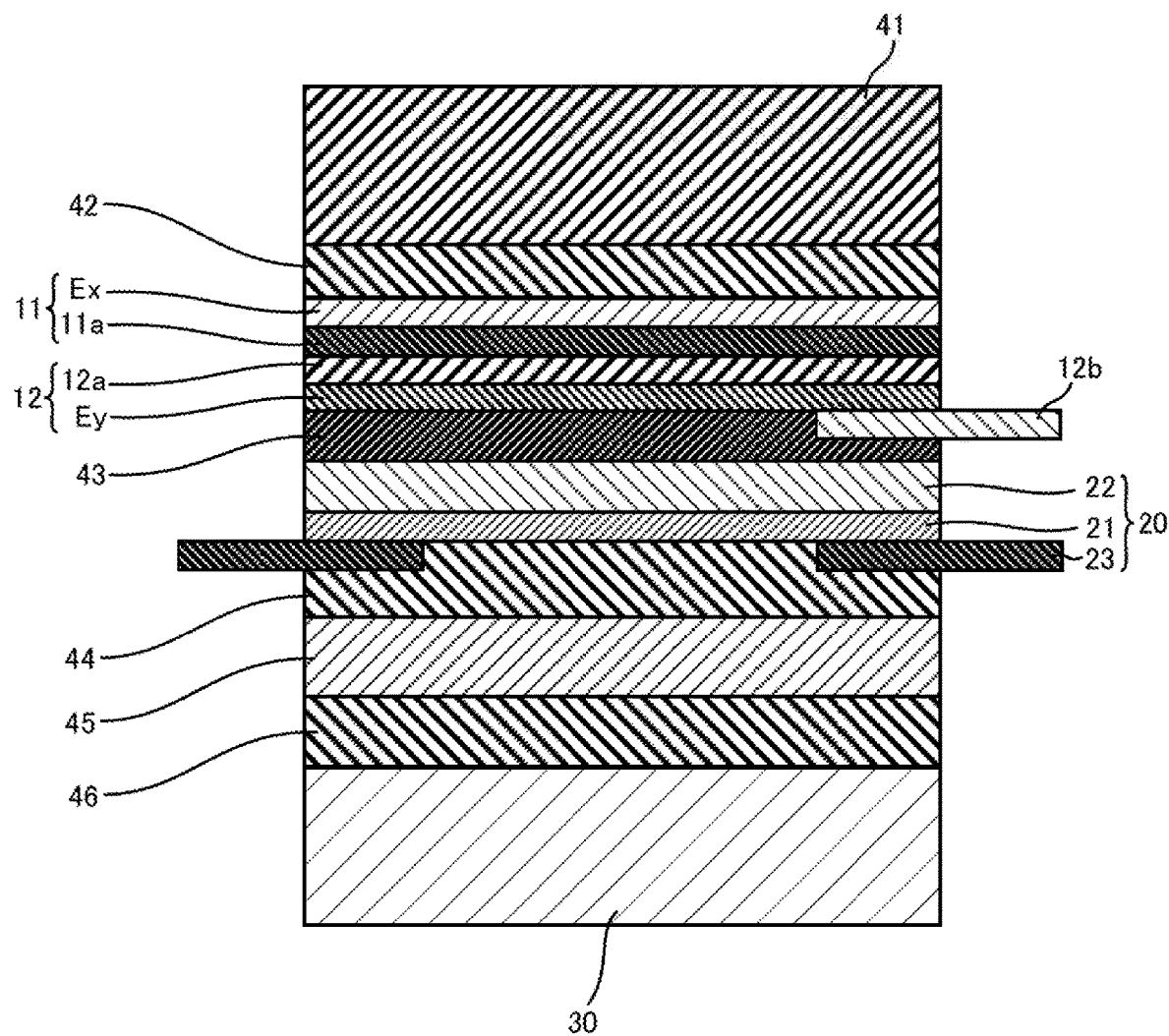
FIG. 2 is a cross-sectional view illustrating a state of the antenna device according to Embodiment 1, taken along a cross section parallel to the Y-Z plane.

FIG. 2 is a cross-sectional view illustrating the antenna device 1, taken along a cross section parallel to the Y-Z plane. As illustrated in FIG. 2, the first electrode layer 11 has the X-direction electrode patterns Ex on one surface of a PET film 11a. The second electrode layer 12 includes Y-direction electrode patterns Ey on one surface of a PET film 12a. Incidentally, though FIG. 2 illustrates an exemplary configuration in which the X-direction electrode patterns Ex of the first electrode layer 11 and the Y-direction electrode patterns Ey of the second electrode layer 12 are formed on different PET films, the configuration may be such that the X-direction electrode pattern Ex of the first electrode layer 11 and the Y-direction electrode patterns Ey of the second electrode layer 12 are formed on each surface of one PET film, respectively.

In the antenna layer 20, the antenna patterns 21 are formed on one surface of the PET film 22. To both ends in the Y direction of the antenna layer 20, flexible printed circuit (FPC) substrates 23 are connected.

Between the display panel 30 and the antenna layer 20, there are provided an optically clear resin (OCR) layer 46, a protection PET film 45, and an optically clear adhesive (OCA) layer 44. The OCR layer 46 and the OCA layer 44 have a function of filling the clearances between the display panel 30, the protection PET film 45, and the antenna layer 20, and at the same time, a function of adjusting the refractive index, and the like.

Figure 3:
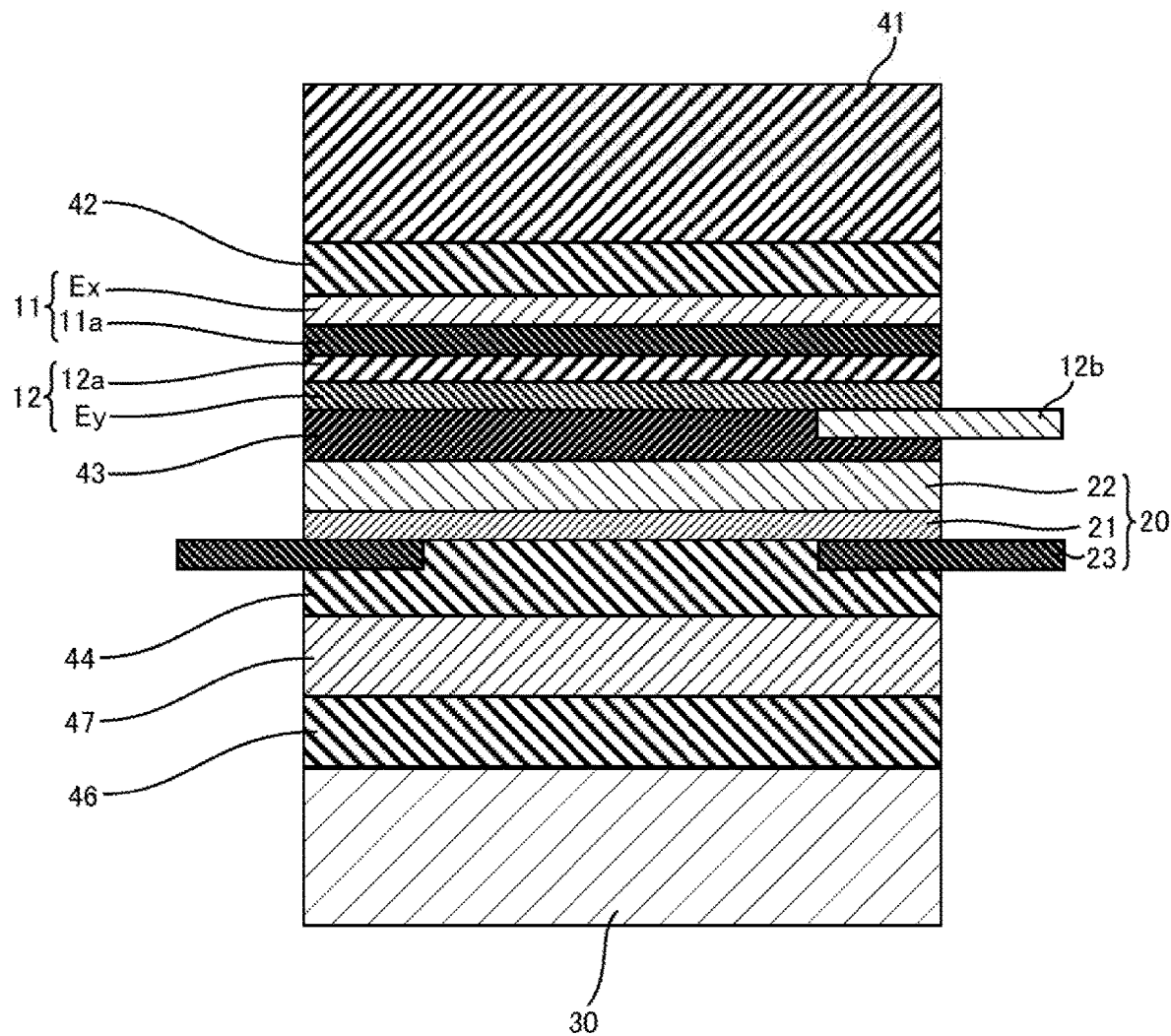
FIG. 3 is a cross-sectional view illustrating a state of a modification example of the antenna device according to Embodiment 1, taken along a cross section parallel to the Y-Z plane.

Alternatively, as illustrated in FIG. 3, the configuration may be such that a light diffusion film 47 is included in place of the protection PET film 45 illustrated in FIG. 2. By providing the light diffusion film 47 between the display panel 30 and the antenna layer 20, moire occurring due to the interference between the pixel patterns on the display panel 30 and the antenna patterns in the antenna layer 20, and the like, can be suppressed.

A lead line (not shown) is drawn from one end in the X direction of each X-direction electrode pattern Ex on the touch panel 10, and a lead line 12b is drawn from each Y-direction electrode pattern Ey. The lead lines are connected to the above-described touch panel controller (not shown). In an upper layer of the touch panel 10, an OCA layer 42 and a cover glass 41 are laminated.

The configuration illustrated in FIGS. 1 to 3 is, however, merely one example, and other arbitrary constituent members can be add as required. Further, in the configuration illustrated in FIGS. 1 to 3, the first electrode layer 11 in which the X-direction electrode patterns Ex are formed is arranged on the front surface side, and the second electrode layer 12 is arranged between the first electrode layer 11 and the antenna layer 20, but the order of lamination of the first electrode layer 11 and the second electrode layer 12 may be reverse to this.

Figure 4:
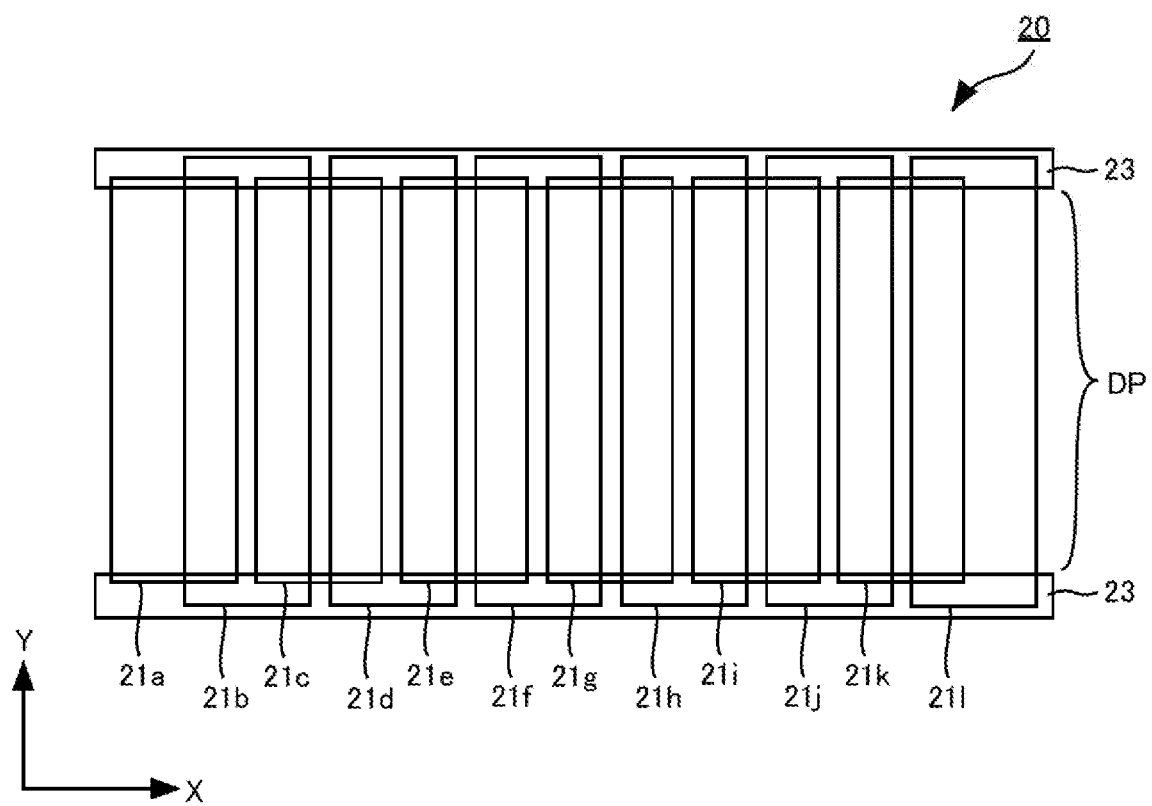
FIG. 4 is a schematic plan view schematically illustrating an arrangement of antenna patterns in an antenna layer.

Next, the following description describes the arrangement of the antenna patterns 21 in the antenna layer 20 while referring to FIG. 4. In the antenna layer 20, a plurality of antenna patterns are formed so as to overlap with one another. More specifically, as illustrated in FIG. 4, the antenna patterns 21a, 21b, 21c, 21d, 21e, . . . , 21k, 21l are formed so as to overlap with one another while being successively shifted by half pitch. More specifically, the arrangement is such that the center line of the clearance between the antenna pattern 21a and the antenna pattern 21c falls on the center line of the antenna pattern 21b. Here, an exemplary configuration that includes twelve antenna patterns is illustrated, but the configuration is not limited to this; the number of antenna patterns is arbitrary. In the description below, in a case where it is not necessary to distinguish individual antenna patterns among the antenna patterns 21, the antenna patterns are generally referred to as "antenna patterns 21".

The rectangular shapes illustrated in FIG. 4 indicating the antenna patterns 21a, 21b . . . schematically illustrate respective areas where the individual antenna coils are arranged, and do not illustrate actual shapes of the antenna lines. Each actual antenna coil is arranged as an antenna coil in a loop form or in a spiral form wound twice or more in each of these areas. The antenna coil can be formed by patterning a transparent metal. Alternatively, for example, a metal mesh laid over an entirety of the antenna layer 20 may be notched so that appropriate patterns are obtained, whereby antenna coils can be formed. Further, by leaving the metal mesh also in areas where antenna lines are unnecessary in the pixel region (leaving the same in an electrically floating state), the antenna patterns can be made less visible.

Figure 5:
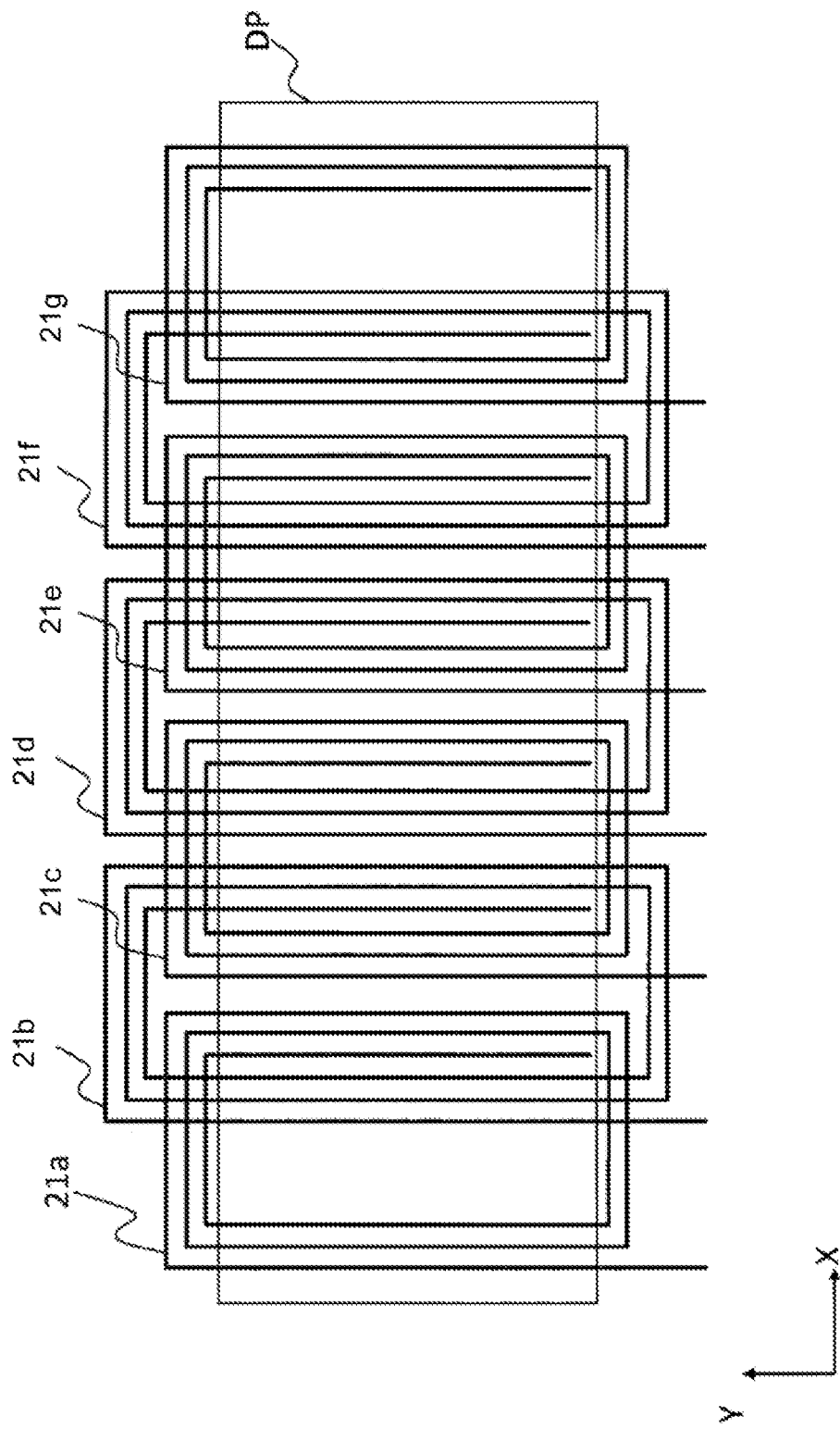
FIG. 5 is a schematic plan view illustrating an exemplary configuration of antenna patterns.

FIG. 5 is a schematic plan view illustrating exemplary antenna patterns 21. FIG. 5 illustrates the antenna patterns 21a to 21g, and the illustration of the other antenna patterns is omitted. As illustrated in FIG. 5, the antenna patterns 21a to 21g are formed so as to overlap while being shifted by half pitch. For example, the arrangement is such that the center line of the clearance between the antenna pattern 21a and the antenna pattern 21c falls on the center line of the antenna pattern 21b.

Each antenna pattern 21 is formed as an antenna coil in a loop form or in a spiral form wound twice or more, as described above. In the pixel region DP illustrated in FIG. 4, the antenna line is formed in a linear form extending in the Y direction. More specifically, in the pixel region DP, each antenna line does not intersect with adjacent one of the antenna lines, but is arranged in parallel in the Y direction.

On the other hand, the antenna lines reaching the surface of the FPC substrates 23 extend along the X direction. Then, in each portion on the FPC substrate 23 where antenna lines of adjacent ones of the antenna patterns intersect with each other when viewed in a plan view, the antenna line of either one of the antenna patterns goes through a contact hole formed in the FPC substrate 23 to be arranged in another layer of the FPC substrate 23. This makes it possible to cause antenna lines of adjacent ones of the antenna patterns to intersect with each other in the FPC substrate areas.

A portion extending in the X direction of the antenna pattern 21 is preferably arranged, not in the pixel region DP, but on the FPC substrate 23. With this configuration, all of the antenna lines are arranged in parallel in the Y direction in the pixel region DP, which makes the antenna lines less visible.

The antenna patterns 21 are connected with an antenna controller (not shown) via the FPC substrates 23. The antenna controller sequentially applies a driving signal to the antenna patterns 21a, 21b, 21c, 21d, 21e, . . . , 21k, 21l. For example, in a case where a near field communication (NFC) card is to be detected, the driving is performed with a sinusoidal wave of 13.56 megahertz.

According to the configuration of the present embodiment, the adjacent ones of the antenna patterns overlap with each other. Even if, therefore, an IC card touches in such a manner that the midpoint of the IC card is positioned on the antenna line of one antenna pattern of the antenna patterns 21a, 21b, 21c, 21d, 21e, . . . , 21k, 21l, the IC card can be detected by an antenna pattern adjacent thereto.

The method for driving the antenna patterns 21, however, may be, not the above-described method of sequentially driving all of the antenna patterns as described above, but a method of simultaneously driving two of the antenna patterns that are located at distanced positions. For example, the method is such that the antenna patterns 21a and 21d are simultaneously driven, and subsequently, the antenna patterns 21b and 21e, the antenna patterns 21c and 21f, the antenna patterns 21d and 21g, the antenna patterns 21e and 21h, the antenna patterns 21f and 21i, the antenna patterns 21g and 21j, the antenna patterns 21h and 21k, and the antenna patterns 21i and 21l are sequentially driven at a given cycle. Adjacent ones of the antenna patterns are sequentially driven by such a driving method as well, which allows an IC card that cannot be detected one antenna pattern to be detected by another adjacent thereto.

As is described above, in the antenna device 1 according to the present embodiment, the antenna patterns 21 are arranged so as to overlap with one another when the antenna layer 20 is viewed in a plan view, whereby an IC card located at such a position that it cannot be detected by one antenna pattern can be detected by another antenna pattern adjacent thereto. This makes it possible to realize a device in which there is no insensitive area throughout the entire display area, thereby to improve the usability. Further, since the antenna layer 20 is a line layer composed of a single layer, it can be manufactured at a lower cost.

Though an exemplary configuration in which all of the antenna patterns 21 are arranged so as to overlap with one another while being shifted by half pitch is described as the present embodiment, the arrangement of the antenna patterns 21 is not limited to this arrangement. Any configuration is acceptable as long as, among a plurality of antenna patterns, at least a part of the antenna patterns are arranged so that each overlaps with an adjacent one, and the interval is not limited to half pitch.

Embodiment 2

The following description describes Embodiment 2. Embodiment 2 is an antenna device that has a configuration of a display device including a touch panel and an antenna element.

Figure 6:
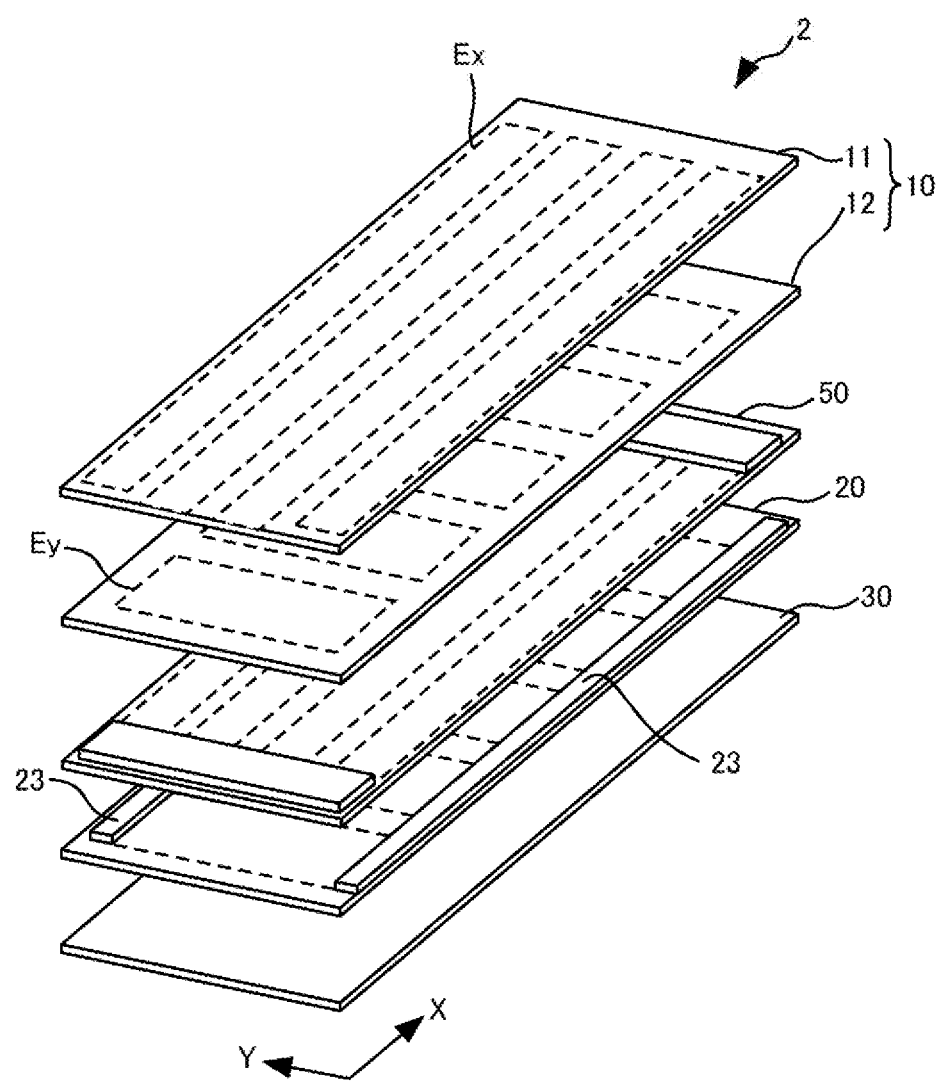
FIG. 6 is exploded perspective view illustrating a schematic configuration of an antenna device in Embodiment 2.

FIG. 6 is an exploded perspective view illustrating a schematic configuration of an antenna device 2 in Embodiment 2. As illustrated in FIG. 2, the antenna device 2 is different from the antenna device 1 according to Embodiment 1 in the point that the antenna device 2 further includes an antenna layer 50 in addition to the antenna layer 20 in Embodiment 1 mentioned above.

The antenna layer 20 includes a plurality of antenna patterns 21 that are arrayed along the X direction, so that the position in the X direction of the IC card can be detected. On the other hand, the antenna layer 50 includes a plurality of antenna patterns 51 that are arrayed along the Y direction, so that the position in the Y direction of the IC card can be detected. The antenna layer 50, at both ends thereof in the X direction, is connected to FPC substrates 52. In this way, when an IC card touches the pixel region DP, the antenna device 2, which includes the two antenna layers according to the present embodiment, is capable of detecting the X, Y coordinates of the touch position.

Figure 7:
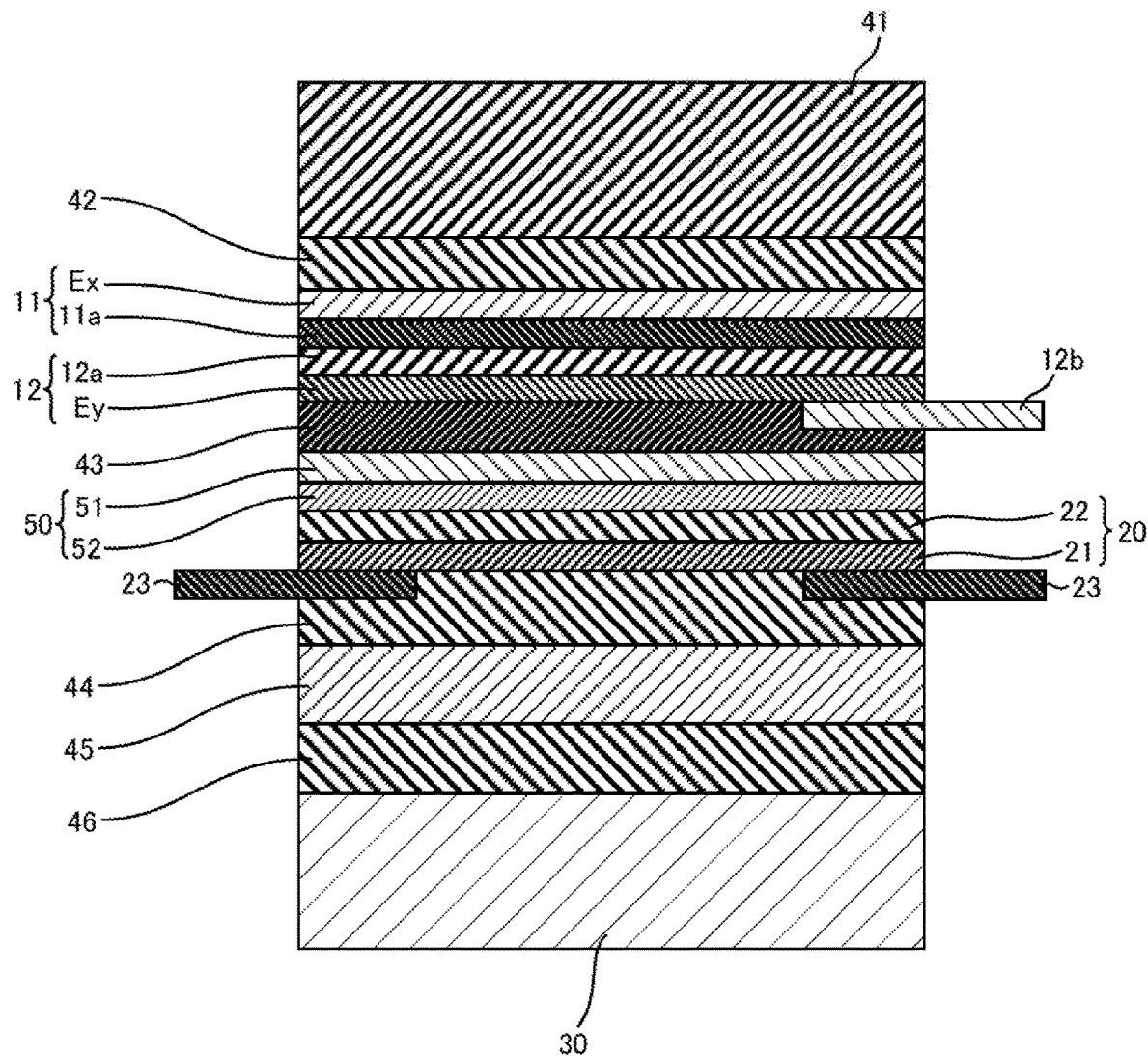
FIG. 7 is a cross-sectional view illustrating a state of the antenna device according to Embodiment 2, taken along a cross section parallel to the Y-Z plane.

FIG. 7 is a cross-sectional view illustrating a state of the antenna device 2, taken along a cross section parallel to the Y-Z plane. As illustrated in FIG. 7, the antenna device 2 includes an antenna layer 50 between the antenna layer 20 and the touch panel 10. The antenna layer 50 includes antenna patterns 51 on one surface of a PET film 52.

The example illustrated in FIG. 7 is an exemplary configuration in which the antenna patterns 21 in the antenna layer 20 and the antenna patterns 51 in the antenna layer 50 are formed on different PET films, respectively, but the configuration may be such that the antenna patterns 21 in the antenna layer 20 and the antenna patterns 51 in the antenna layer 50 are formed on both surfaces of one PET film, respectively.

Further, though FIG. 7 illustrates an exemplary configuration in which the antenna layer 50 is interposed between the antenna layer 20 and the touch panel 10, the positions of the antenna layer 20 and the antenna layer 50 may be reversed.

Figure 8:
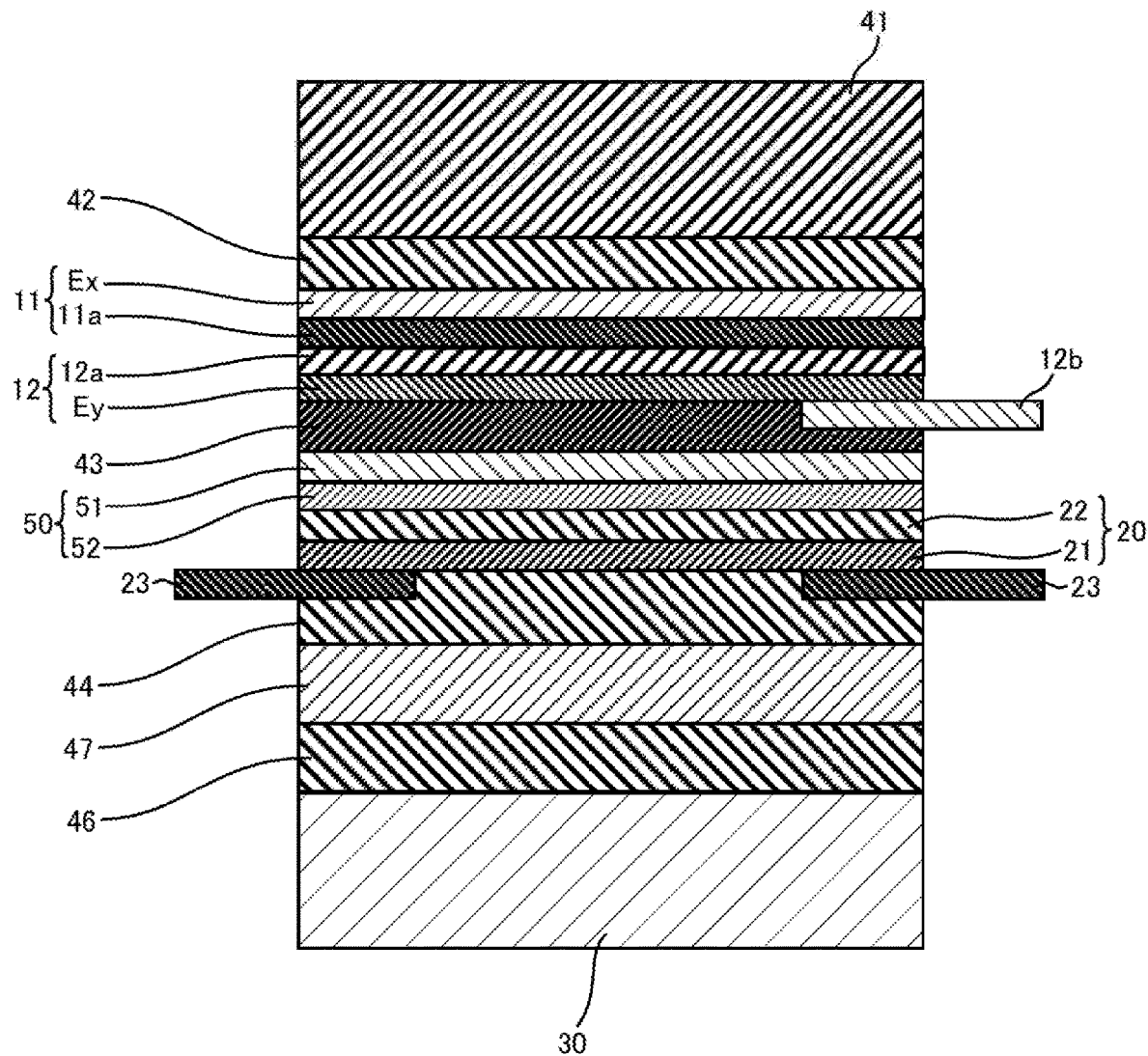
FIG. 8 is a cross-sectional view illustrating a state of a modification example of the antenna device according to Embodiment 2, taken along a cross section parallel to the Y-Z plane.

Further, as illustrated in FIG. 8, the configuration may be such that a light diffusion film 47 is included in place of the protection PET film 45 illustrated in FIG. 7. By providing the light diffusion film 47 between the display panel 30 and the antenna layer 20, moire occurring due to the interference between the pixel patterns on the display panel 30 and the antenna patterns in the antenna layer 20 and the antenna layer 50, and the like, can be suppressed.

Figure 9:
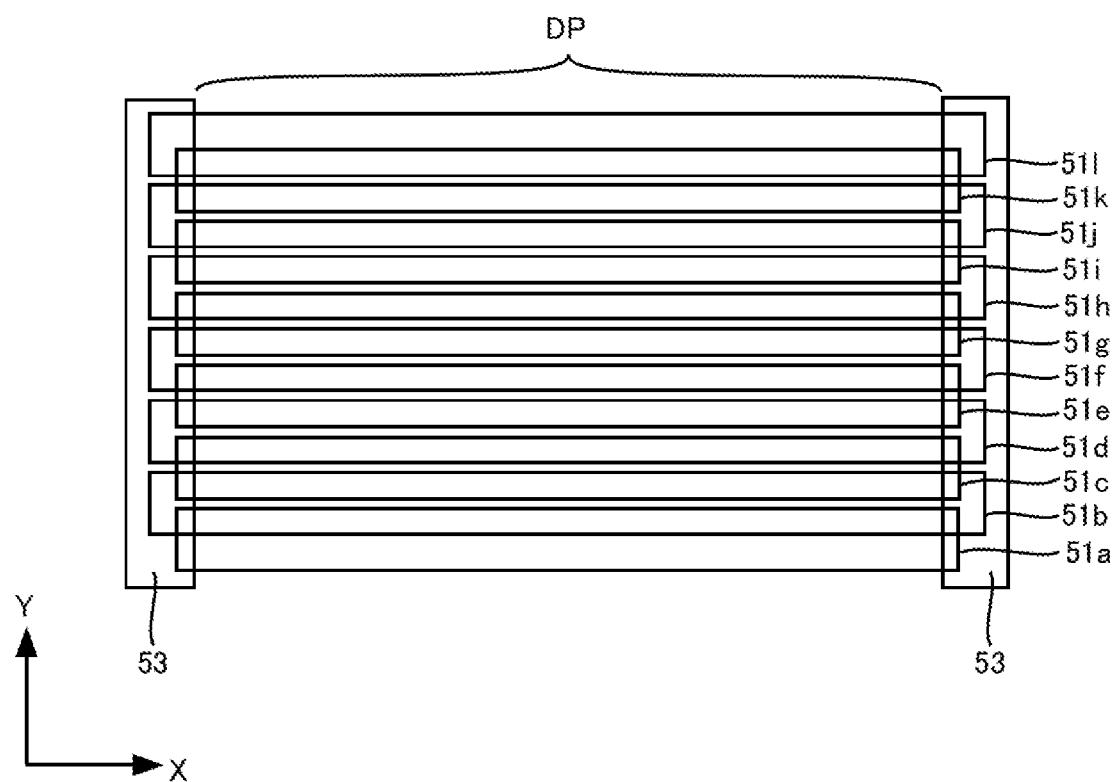
FIG. 9 is a schematic plan view schematically illustrating an arrangement of antenna patterns in an antenna layer in Embodiment 2.

As illustrated in FIG. 9, the antenna patterns 51 in the antenna layer 50 are arranged so as to overlap with the adjacent antenna patterns while being shifted by half pitch, as is the case with the antenna patterns 21 in the antenna layer 20. Here, an exemplary configuration in which twelve antenna patterns 51a, 51b, . . . 51l are included is disclosed, but the configuration is not limited to this. The number of the antenna patterns in the antenna layer 50 is arbitrary. In the description below, in a case where it is not necessary to distinguish individual antenna patterns among the antenna patterns 51, the antenna patterns are generally referred to as "antenna patterns 51".

The rectangular shapes illustrated in FIG. 9 indicating the antenna patterns 51a, 51b . . . schematically illustrate respective areas where the individual antenna coils are arranged, and do not illustrate actual shapes of the antenna lines. Each actual antenna coil is arranged as an antenna coil in a loop form or in a spiral form wound twice or more in each of these areas. The antenna coil can be formed by patterning a transparent metal. Alternatively, for example, a metal mesh laid over an entirety of the antenna layer 50 may be notched so that appropriate patterns are obtained, whereby antenna coils can be formed. Further, by leaving the metal mesh also in areas where antenna lines are unnecessary in the pixel region (leaving the same in an electrically floating state), the antenna patterns can be made less visible.

Figure 10:
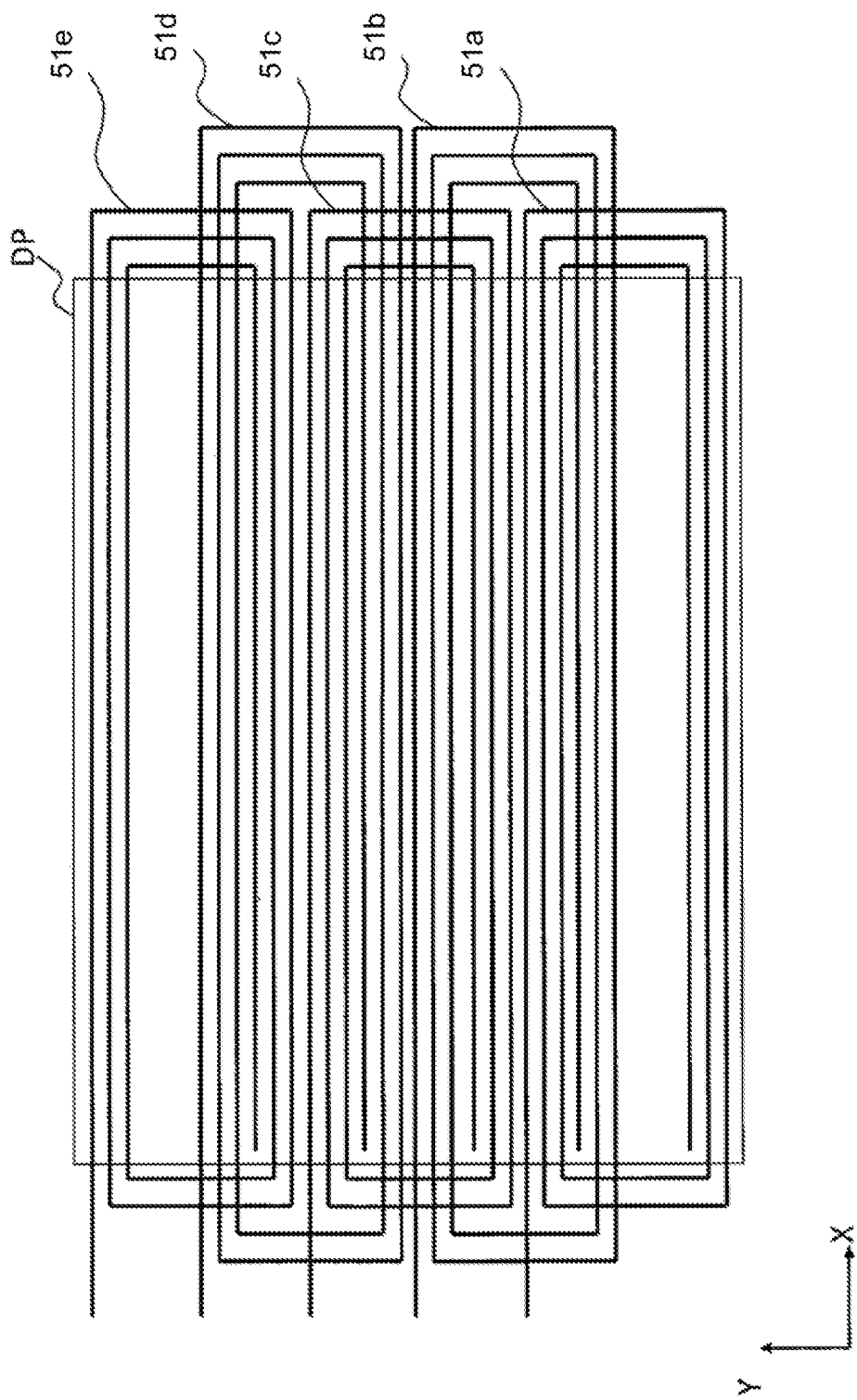
FIG. 10 is a schematic plan view illustrating an exemplary configuration of antenna patterns.
Figure 11:
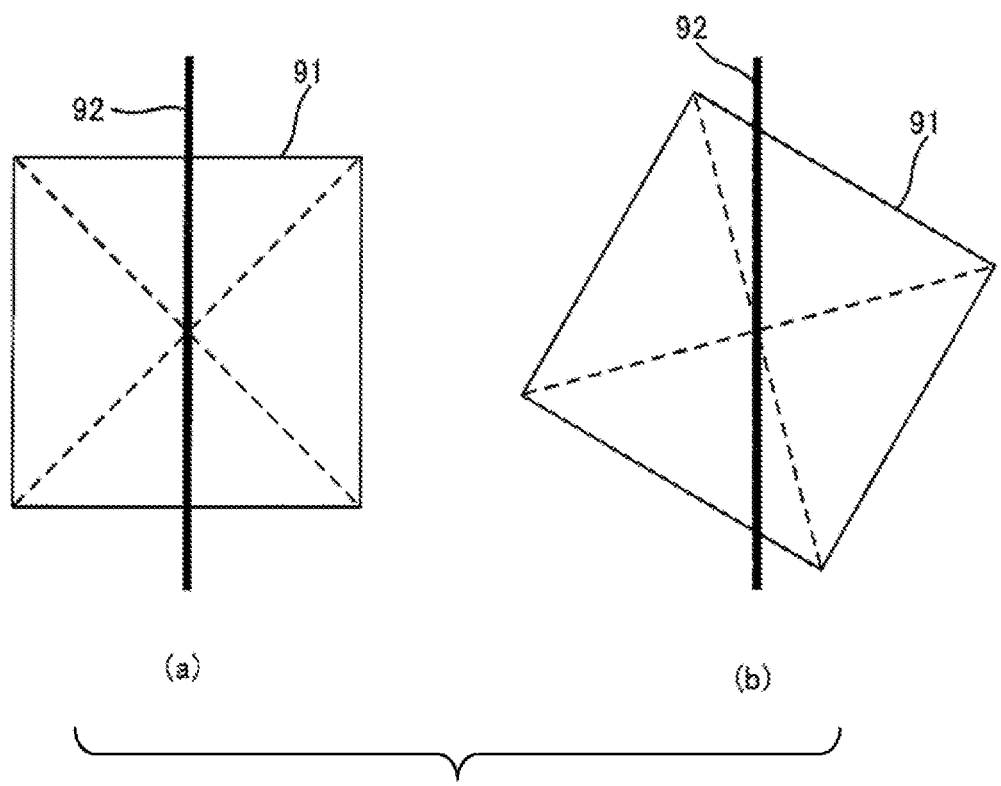
FIG. 11 (a) and (b) of FIG. 11 schematically illustrate states of a conventional antenna device in which an IC card cannot be detected.

FIG. 10 is a schematic plan view illustrating exemplary antenna patterns 51. FIG. 10 illustrates the antenna patterns 51a to 51e, and the illustration of the other antenna patterns is omitted. As illustrated in FIG. 10, the antenna patterns 51a to 51e are formed so as to overlap while being shifted by half pitch. For example, the arrangement is such that the center line of the clearance between the antenna pattern 51a and the antenna pattern 51c falls on the center line of the antenna pattern 51b.

Each antenna pattern 51 is formed as an antenna coil in a loop form or in a spiral form wound twice or more, as described above. In the pixel region DP, the antenna line is formed in a linear form extending in the X direction. More specifically, in the pixel region DP, each antenna line of the antenna patterns 51 does not intersect with adjacent one of the antenna lines, but is arranged in parallel in the X direction.

On the other hand, the antenna lines reaching the surface of the FPC substrates 53 extend along the Y direction. Then, in each portion on the FPC substrate 53 where antenna lines of adjacent ones of the antenna patterns intersect with each other when viewed in a plan view, the antenna line of either one of the antenna patterns goes through a contact hole formed in the FPC substrate 53 to be arranged in another layer of the FPC substrate 53. This makes it possible to cause antenna lines of adjacent ones of the antenna patterns to intersect with each other in the FPC substrate areas.

A portion extending in the Y direction of the antenna pattern 51 is preferably arranged, not in the pixel region DP, but on the FPC substrate 53. With this configuration, all of the antenna lines are arranged in parallel in the X direction in the pixel region DP, which makes the antenna lines less visible.

The method for driving the antenna patterns 51 in the antenna layer 50 is identical to the method for driving the antenna patterns 21. In other words, the touch panel controller sequentially applies a driving signal to the antenna patterns 51a, 51b. 51c. 51d, 51e, . . . , 51k, 51l. Alternatively, the method for driving the antenna patterns 51, however, may be, not the above-described method of sequentially driving all of the antenna patterns 51 in this way, but a method of simultaneously driving two of the antenna patterns that are located at distanced positions. For example, the method is such that the antenna patterns 51a and 51d are simultaneously driven, and subsequently, the antenna patterns 51b and 51e, the antenna patterns 51c and 51f, the antenna patterns 51d and 51g, the antenna patterns 51e and 51h, the antenna patterns 51f and 51i, the antenna patterns 51g and 51j, the antenna patterns 51h and 51k, and the antenna patterns 51i and 51l are sequentially driven at a given cycle. Adjacent ones of the antenna patterns are sequentially driven by these driving methods, which allows an IC card that cannot be detected one antenna pattern to be detected by another adjacent one of the antenna patterns.

As is described above, in the antenna device according to Embodiment 2, the X coordinate of the IC card can be detected by the antenna layer 20, and the Y coordinate of the IC card can be detected by the antenna layer 50, respectively, with high accuracy. Further, since the antenna layer 20 is a line layer composed of a single layer, and so is the antenna layer 50, these layers can be manufactured at a lower cost.

Though an exemplary configuration in which the all of the antenna patterns 21 and 51 are arranged so as to overlap with one another while being shifted by half pitch is described as the present embodiment as well, the arrangement of the antenna patterns 21 and 51 is not limited to this arrangement. Any configuration is acceptable as long as, among a plurality of antenna patterns, at least a part of the antenna patterns are arranged so that each overlaps with an adjacent one, and the interval is not limited to half pitch.

The above-described embodiment is merely an example for implementing the present invention. The present invention, therefore, is not limited to the above-described embodiment, and the above-described embodiment can be appropriately varied and implemented without departing from the spirit and scope of the invention.

For example, Embodiments 1 and 2 are described with reference to an exemplary case where the antenna device of the present invention is formed as a touch-panel-equipped display device. A touch panel and a display device, however, are not essential, and the present invention can be implemented as an IC card reader for reading information from an IC card that is caused to approach to the IC card reader. Further, even in a case where a touch panel is included, the configuration of the touch panel is not limited to that disclosed herein, and a touch panel of an arbitrary configuration (for example, an optical-type touch panel, a resistance-film-type touch panel) can be adopted.

Further, though an IC card and an NFC card are mentioned in the foregoing description as examples of objects from which information is to be read out by near field wireless communication, an object to be read is not limited to a card, and a variety of types can be adopted.

DESCRIPTION OF REFERENCE NUMERALS

1: antenna device
2: antenna device

10: touch panel
11: first electrode layer
12: second electrode layer
20: antenna layer
21: antenna pattern
23: FPC substrate
30: display panel
50: antenna layer
51: antenna pattern
53: FPC substrate

The invention claimed is:

1. An antenna device that reads information via Near Field Communication (NFC), the antenna device comprising:
   at least one antenna substrate;
   a plurality of antennas configured to read information via NFC, the plurality of antennas including a plurality of antenna patterns arrayed in parallel with one another in a first direction on the at least one antenna substrate between flexible printed circuit (FPC) substrates that are parallel to each other in a second direction normal to the first direction; and
   the flexible printed circuit substrates are separately provided from the at least one antenna substrate and connected with the plurality of antenna patterns at both ends of the at least one antenna substrate in the second direction and extend outward from the both ends in a plan view,
   wherein at least a part of the plurality of antenna patterns is arranged so as to overlap with at least another part of one of the plurality of antenna patterns when the at least one substrate is viewed in a plan view, and
   wherein in a portion of the antenna device where antenna lines of adjacent antenna patterns of the plurality of antenna patterns intersect with each other at the FPC substrates when viewed in the plan view at locations where the antenna patterns overlap the FPC substrates, the antenna lines are provided in different layers of the FPC substrates.

2. The antenna device according to claim 1, wherein the at least a part of the plurality of antenna patterns are is arranged so as to be shifted by half pitch of a width of the at least the part of the plurality of antenna patterns in the first direction.

3. The antenna device according to claim 1, wherein each of the plurality of antenna patterns is formed in a loop form or in a spiral form wound twice or more.

4. The antenna device according to claim 1, wherein:
   two sets of antenna substrates are provided;
   the two sets of the antenna substrates and the plurality of antenna patterns are arranged in such a manner that a direction in which antenna patterns included in one of the two sets of the plurality of antenna substrates are arrayed; and
   a direction in which the antenna patterns included in other sets of the two sets of the plurality of antenna substrates are arrayed, intersect at right angles.

5. The antenna device according to claim 4, further comprising a display panel.

6. The antenna device according to claim 5, further comprising a light diffusion film provided between the display panel and the at least one antenna substrate.

7. The antenna device according to claim 5, further comprising a touch panel.

8. The antenna device according to claim 4, wherein the plurality of antenna patterns are made of a transparent metal or a metal that is patterned in a mesh form.

9. The antenna device according to claim 4, wherein:
   each of the plurality of antenna patterns includes a first antenna line that extends in the second direction, and a second antenna line that is connected with the first antenna line and extends in the first direction; and
   in a portion of the antenna device where the first antenna line of one antenna pattern of the plurality of antenna patterns intersects with the second antenna line of an adjacent antenna pattern of the plurality of antenna patterns when viewed in a plan view, the first antenna line and the second antenna line are provided in different layers of the FPC substrates.

* * * * *